United States Patent
Tomizawa et al.

(10) Patent No.: US 8,123,253 B2
(45) Date of Patent: Feb. 28, 2012

(54) RELAY BOX PROTECTIVE STRUCTURE

(75) Inventors: Tatsuya Tomizawa, Kanagawa (JP);
Hideyuki Takahashi, Kanagawa (JP);
Kenji Fujimori, Kanagawa (JP);
Hiroshi Ichikawa, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 265 days.

(21) Appl. No.: 12/516,469

(22) PCT Filed: Nov. 27, 2007

(86) PCT No.: PCT/JP2007/072866
§ 371 (c)(1),
(2), (4) Date: Jun. 4, 2009

(87) PCT Pub. No.: WO2008/066047
PCT Pub. Date: Jun. 5, 2008

(65) Prior Publication Data
US 2010/0025978 A1 Feb. 4, 2010

(30) Foreign Application Priority Data
Nov. 27, 2006 (JP) ................................. 2006-318817

(51) Int. Cl.
*B62D 25/18* (2006.01)
(52) U.S. Cl. ...................... 280/851; 280/853; 280/152.2; 180/68.5; 296/198
(58) Field of Classification Search ............. 280/152.05, 280/152.2; 180/68.5; 296/198, 199, 37.3, 296/37.1
See application file for complete search history.

(56) References Cited

U.S. PATENT DOCUMENTS

| 3,198,545 | A | * | 8/1965 | McDaniel | 280/851 |
|---|---|---|---|---|---|
| 6,664,472 | B2 | * | 12/2003 | Saneto et al. | 174/66 |
| 7,984,779 | B2 | * | 7/2011 | Boegelein et al. | 180/68.5 |
| 2002/0191385 | A1 | * | 12/2002 | Miyazaki | 361/826 |
| 2004/0159481 | A1 | * | 8/2004 | Schneider et al. | 180/68.5 |
| 2006/0096794 | A1 | * | 5/2006 | Yoshida | 180/65.1 |
| 2008/0314662 | A1 | * | 12/2008 | Bogelein et al. | 180/68.5 |
| 2011/0000729 | A1 | * | 1/2011 | Schwarz et al. | 180/68.5 |

FOREIGN PATENT DOCUMENTS

| JP | 2004-058725 A | 2/2004 |
|---|---|---|
| JP | 2006-015789 A | 1/2006 |

OTHER PUBLICATIONS

Hiroyuki Tachikawa, Turning Up Prevention Structure for Mud Guard, Jan. 19, 2006, JPO, JP 2006-015789 A, Machine Translation of Description.*
Shinichi Minowa, Valve Protective Structure, Feb. 26, 2004, JPO, JP 2004-058725 A, Machine Translation of Description.*

* cited by examiner

*Primary Examiner* — Ruth Ilan
*Assistant Examiner* — James English

(57) ABSTRACT

A relay box protective structure, which protects a relay box from a tread surface stripped off when a tire 2 bursts, and includes a fender 3, a relay box 6, a relay box cover 7, and a movement restricting component 10, is provided. The fender 3 is fixed to a frame 1 of a vehicle body. The relay box 6 is arranged higher than and behind a lower end 3a of the fender 3, and fixed to the vehicle body. The relay box cover 7 is arranged higher than and behind the lower end 3a of the fender 3, includes a bottom 8 covering a lower surface of the relay box 6, and is fixed to the vehicle body. The movement restricting component 10 is fixed to the frame 1 behind a back end 7a of the relay box cover 7, restricting movement of the relay box cover 7 towards the vehicle front.

6 Claims, 7 Drawing Sheets

RELAY BOX PROTECTIVE STRUCTURE

TECHNICAL FIELD

The present invention relates to a relay box protective structure.

BACKGROUND ART

Conventionally, a structure having a roll-up preventive component, which prevents the mudguard provided below a fender from rolling up and extends forward toward a relay box supporting bracket supporting a relay box behind a mudguard, is provided covering a lower surface of the relay box. [Patent Document 1] Japanese Unexamined Patent Application Publication No. 2006-15789

DISCLOSURE OF INVENTION

Problem to be Solved by the Invention

However, with this structure, the roll-up preventive component is provided only enough strength for preventing the mudguard from rolling up. Therefore, when a tire bursts while the vehicle is traveling, the tire tread surface stripped off, and the stripped off tread surface is beaten like a whip onto the roll-up preventive component. As a result, there is fear that the roll-up preventive component will deform, and the relay box will be beaten onto the tread surface and damaged. Moreover, with this structure, since there is only a mudguard at the front of the relay box, the relay box will be beaten from the front even if sufficient strength is provided to the roll-up preventive component.

The present invention is devised to resolve the above-given problem, and aims to provide a relay box protective structure which protects a relay box when a tire bursts.

Means of Solving the Problem

A first aspect of the relay box protective structure according to the present invention, which should accomplish the above-given purpose, includes a fender, a relay box, a relay box cover, and a movement restricting component. The fender is fixed to a frame of a vehicle body. The relay box is arranged higher than and behind the lower end of the fender, and fixed to the vehicle body. The relay box cover is arranged higher than and behind the lower end of the fender, includes a bottom covering at least a lower surface of the relay box, and is fixed to the vehicle body. The movement restricting component is fixed to the frame behind the back end of the relay box cover, restricting movement of the relay box cover towards the vehicle front.

With this structure, the relay box is arranged higher than and behind the lower end of the fender, and the lower surface thereof is covered by the relay box cover. In other words, the front surface and the lower surface of the relay box are protected by the fender and the relay box cover. Accordingly, the relay box may be protected from the tread surface stripped off when a tire bursts. Moreover, since movement towards the vehicle front is restricted by the movement restricting component, even when a strong tensile force towards the vehicle front is applied to the relay box cover from the tread surface, protection of the relay box by the relay box cover may be secured.

Alternatively, a second aspect of the relay box protective structure according to the present invention has the relay box protective structure of the first aspect, however the relay box cover comprises a backside covering a back surface of the relay box, and the backside is fixed to the frame via the movement restricting component.

With this structure, the front surface and the lower surface of the relay box are protected by the fender and the relay box cover, and the back surface is protected by the backside of the relay box cover. Accordingly, protection of the relay box from the tread surface stripped off when a tire bursts may be secured. Moreover, since the backside of the relay box cover is fixed to the frame via the movement restricting component, so as to restrict movement towards the vehicle front, even when a strong tensile force towards the vehicle front is applied to the relay box cover from the tread surface, protection of the relay box by the relay box cover may be secured.

Further alternatively, a third aspect of the relay box protective structure according to the present invention has the relay box protective structure of the first aspect, however further includes a battery carrier fixed to the frame behind the back end of the relay box cover, wherein the bottom is fixed to the frame via the movement restricting component.

With this structure, the battery carrier is fixed to the frame behind the back end of the relay box cover. Accordingly, the tread surface stripped off when the tire bursts will beat on the battery carrier even if it extends behind the relay box cover. Namely, the battery carrier substantially protects the back surface of the relay box. Moreover, since the bottom of the relay box cover is fixed to the frame via the movement restricting component, so as to restrict movement towards the vehicle front, even when a strong tensile force towards the vehicle front is applied to the relay box cover from the tread surface, protection of the relay box by the relay box cover may be secured.

Yet further alternatively, a fourth aspect of the relay box protective structure according to the present invention has the relay box protective structure of the first aspect, however, the bottom includes a hook hole, and the relay box protective structure further includes a battery carrier fixed to the frame behind the back end of the relay box cover. The movement restricting component is arranged between the battery carrier and the hook hole, and includes one end connected to the battery carrier and the other end engaged with the hook hole; and the other end is engaged with the hook hole, restricting movement of the relay box cover.

With this structure, the battery carrier is fixed to the frame behind the back end of the relay box cover. Accordingly, the tread surface stripped off when the tire bursts will beat on the battery carrier even if it extends behind the relay box cover. Namely, the battery carrier substantially protects the back surface of the relay box. Moreover, movement of the relay box cover towards the vehicle front is restricted while the hook hole is formed in the relay box cover and the other end of the movement restricting component, the one end thereof connected to the battery carrier, is joined to the hook hole. As a result, even when a strong tensile force towards the vehicle front is applied to the relay box cover from the tread surface, protection of the relay box by the relay box cover may be secured.

Result of Invention

According to the present invention, a relay box is protected when a tire bursts.

DESCRIPTION OF REFERENCE NUMERALS

Figure 1:
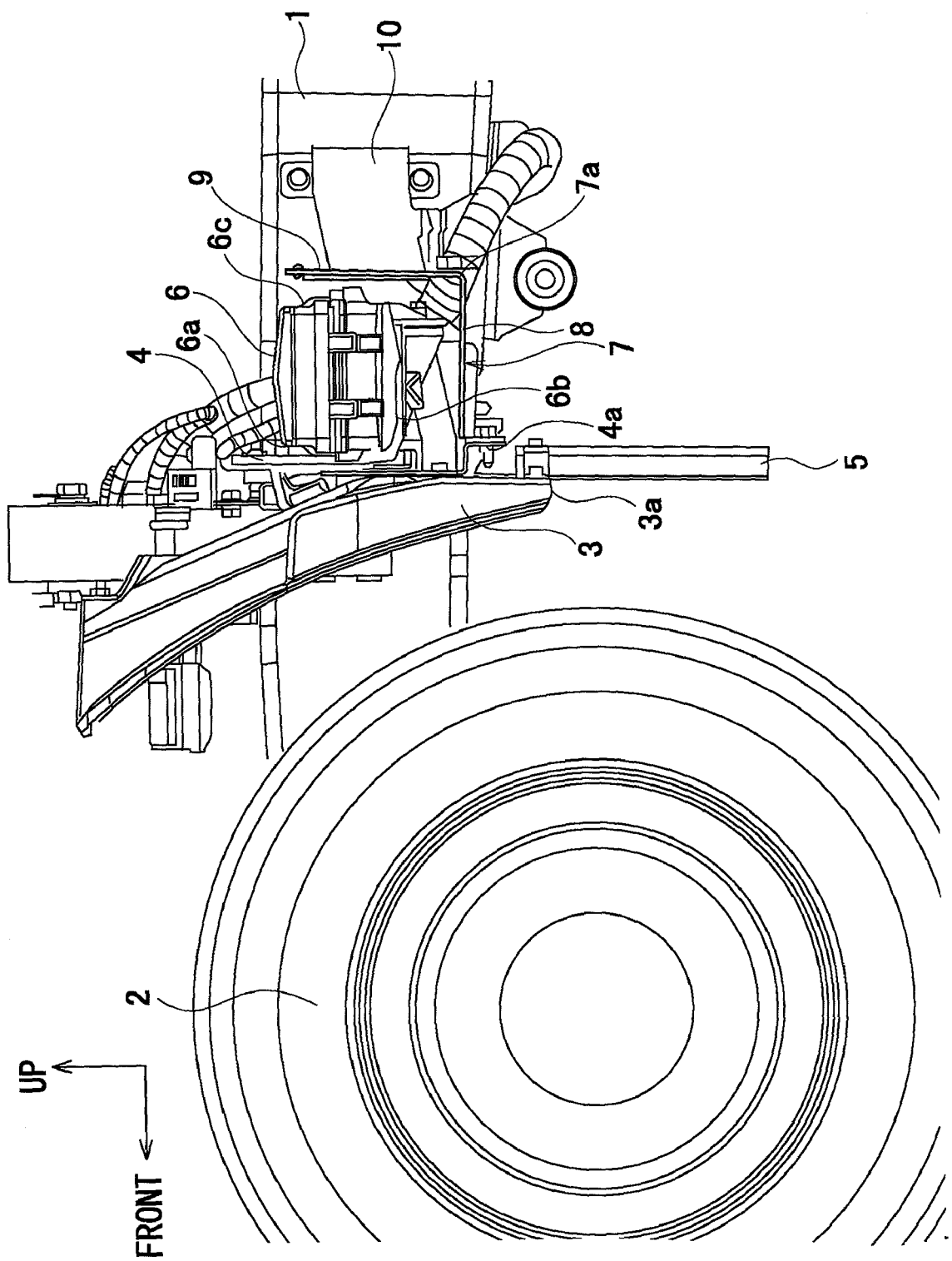
FIG. 1 is an outline side view of a relay box protective structure according to a first embodiment.

1 Frame
2 Tire
3 Fender
3a Lower end
4 Bracket
4a Lower end
5 Mudguard
6: Relay box
6a Front surface
6b Lower surface
6c Back surface
7 Relay box cover
7a Back end
8 Bottom
9 Backside
9a Side end
10 Movement restricting component
11 Movement restricting component
12 Battery carrier bracket
13 Battery carrier
13a Front end
14 Hook hole
15 Movement restricting component
15a Joint
15b Engagement part
16 Movement restricting component
16a Holding part
16b Engagement part

BEST MODE FOR CARRYING OUT THE INVENTION

First Embodiment

Figure 2:
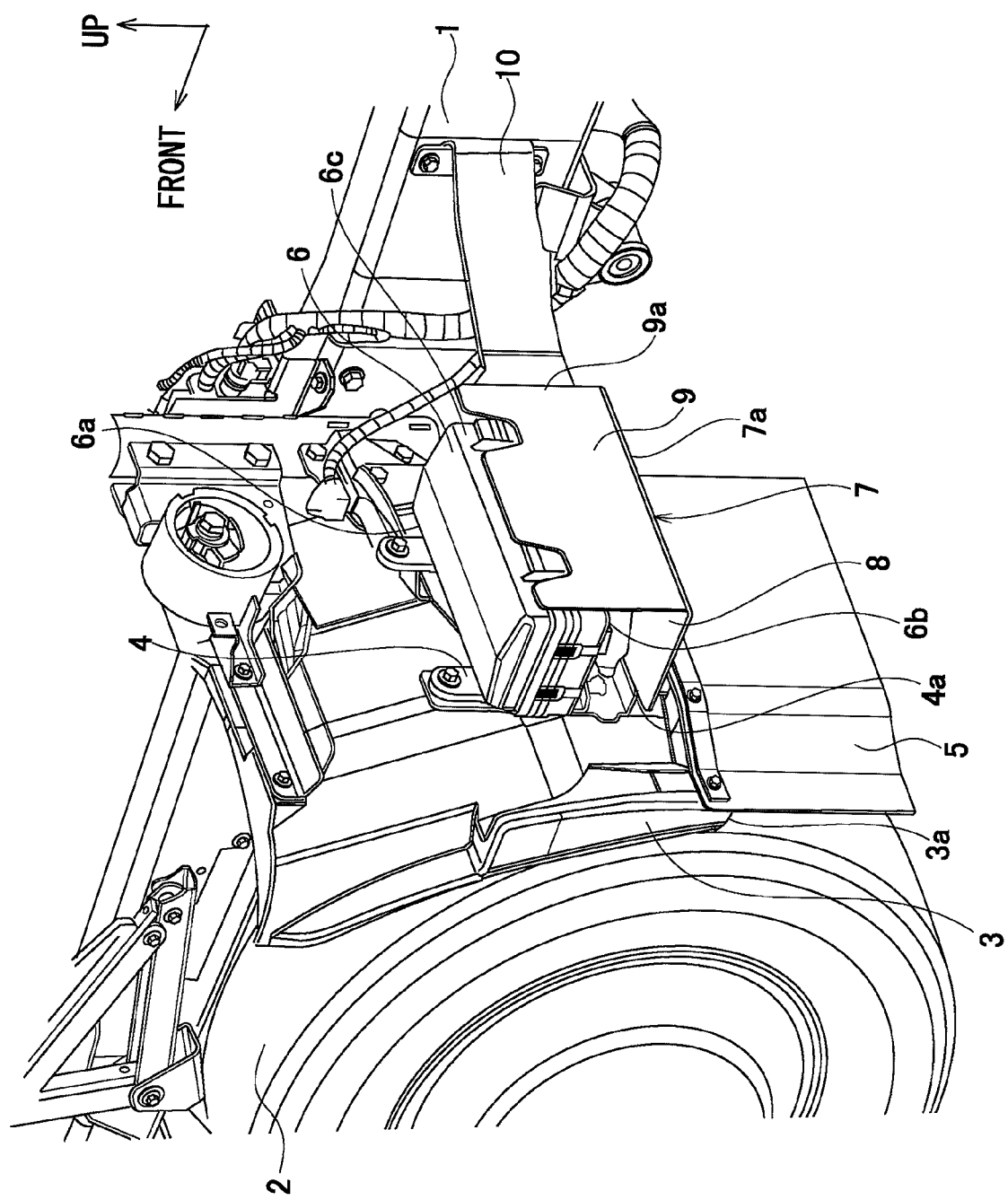
FIG. 2 is an outline perspective view of the relay box protective structure according to the first embodiment.

Hereafter, a first embodiment according to the present invention is described with reference to drawings. FIG. 1 is an outline side view of a relay box protective structure according to the first embodiment, and FIG. 2 is an outline perspective view of the relay box protective structure according to the first embodiment. Note that 'UP' in the drawings denotes vehicle top, and 'FRONT' denotes vehicle front.

As shown in FIGS. 1 and 2, in a vehicle frame 1, a fender 3 is fixed via a bracket 4 covering a tire 2, and a mudguard 5 is fixed to a lower end 3a of the fender 3. A relay box 6 is arranged higher than and behind the lower end 3a of the fender 3, and fixed to the back surface of the bracket 4. A relay box cover 7 is arranged behind the fender 3 and higher than the lower end 3a and fixed to a lower end 4a of the bracket 4.

The relay box cover 7 has an approximately L-shaped plate form, and is constituted by a horizontal bottom 8 covering a lower surface 6b of the relay box 6 and a vertical backside 9 covering a back surface 6c.

An approximately plate-shaped movement restricting component 10 is arranged behind a back end 7a of the relay box cover 7. The movement restricting component 10 has one end fixed to the frame 1, and the other end joined to a side end 9a of the backside 9 of the relay box cover 7.

In this manner, according to the first embodiment, the relay box 6 is arranged higher than and behind the lower end 3a of the fender 3, and the lower surface 6b and the back surface 6c are covered by the bottom 8 and the backside 9 of the relay box cover 7, respectively. In other words, the relay box 6 has the front surface 6a, the lower surface 6b, and the back surface 6c protected by the fender 3, the bottom 8, and the backside 9. Accordingly, the relay box 6 may be protected from the tread surface stripped off when the tire 2 bursts. Moreover, since the backside 9 of the relay box cover 7 is fixed to the frame 1 by the movement restricting component 10 so as to restrict movement towards the vehicle front, even when a strong tensile force towards the vehicle front is applied to the relay box cover 7 from the tread surface, protection of the relay box 6 by the relay box cover 7 may be secured.

Second Embodiment

Figure 3:
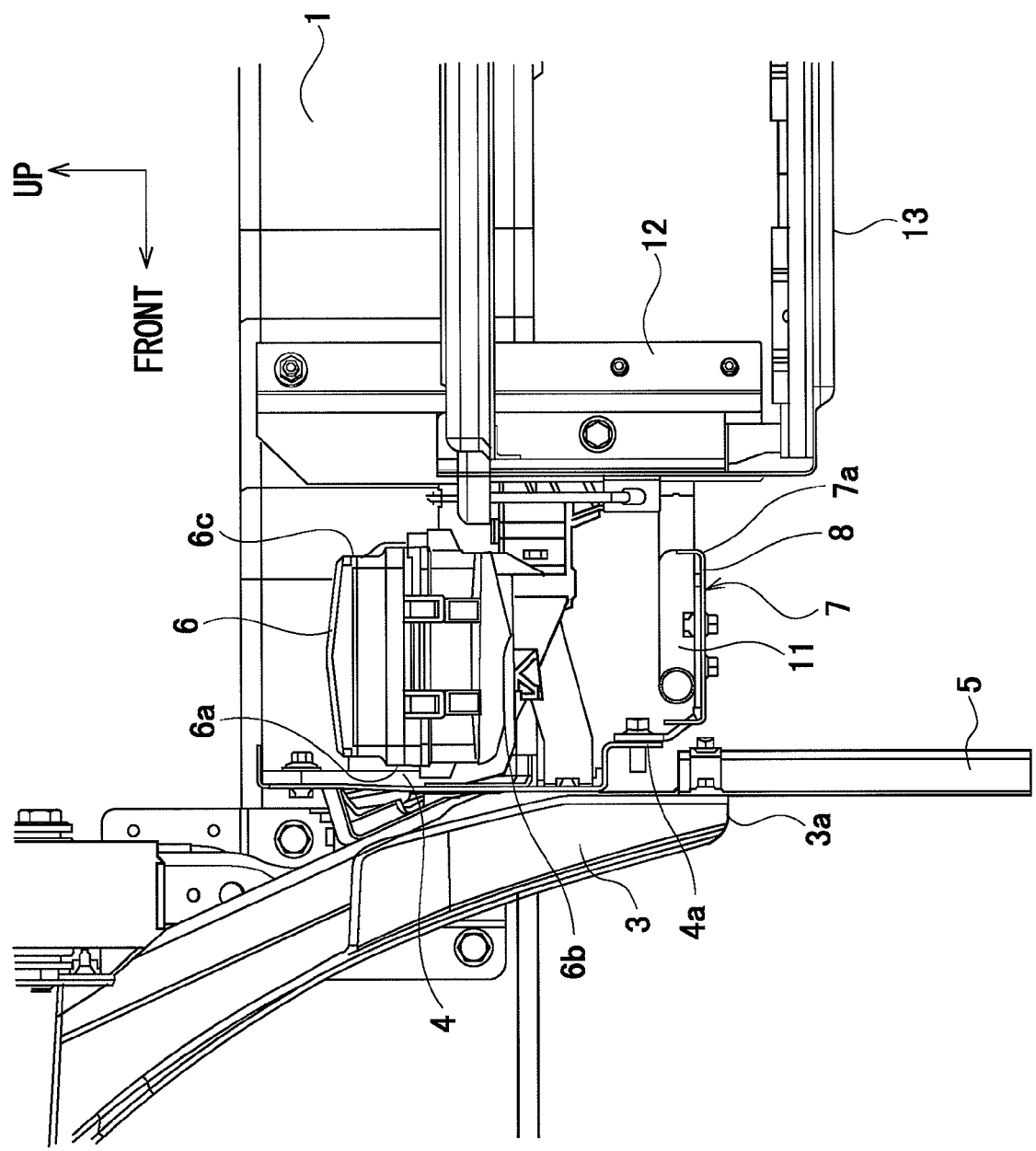
FIG. 3 is an outline side view of a relay box protective structure according to a second embodiment.

Next, a second embodiment according to the present invention is described with reference to drawings. FIG. 3 is an outline side view of a relay box protective structure according to the second embodiment, and FIG. 2 is an outline perspective view of the relay box protective structure according to the second embodiment. Note that detailed description of a shared structure with the first embodiment is omitted.

Figure 4:
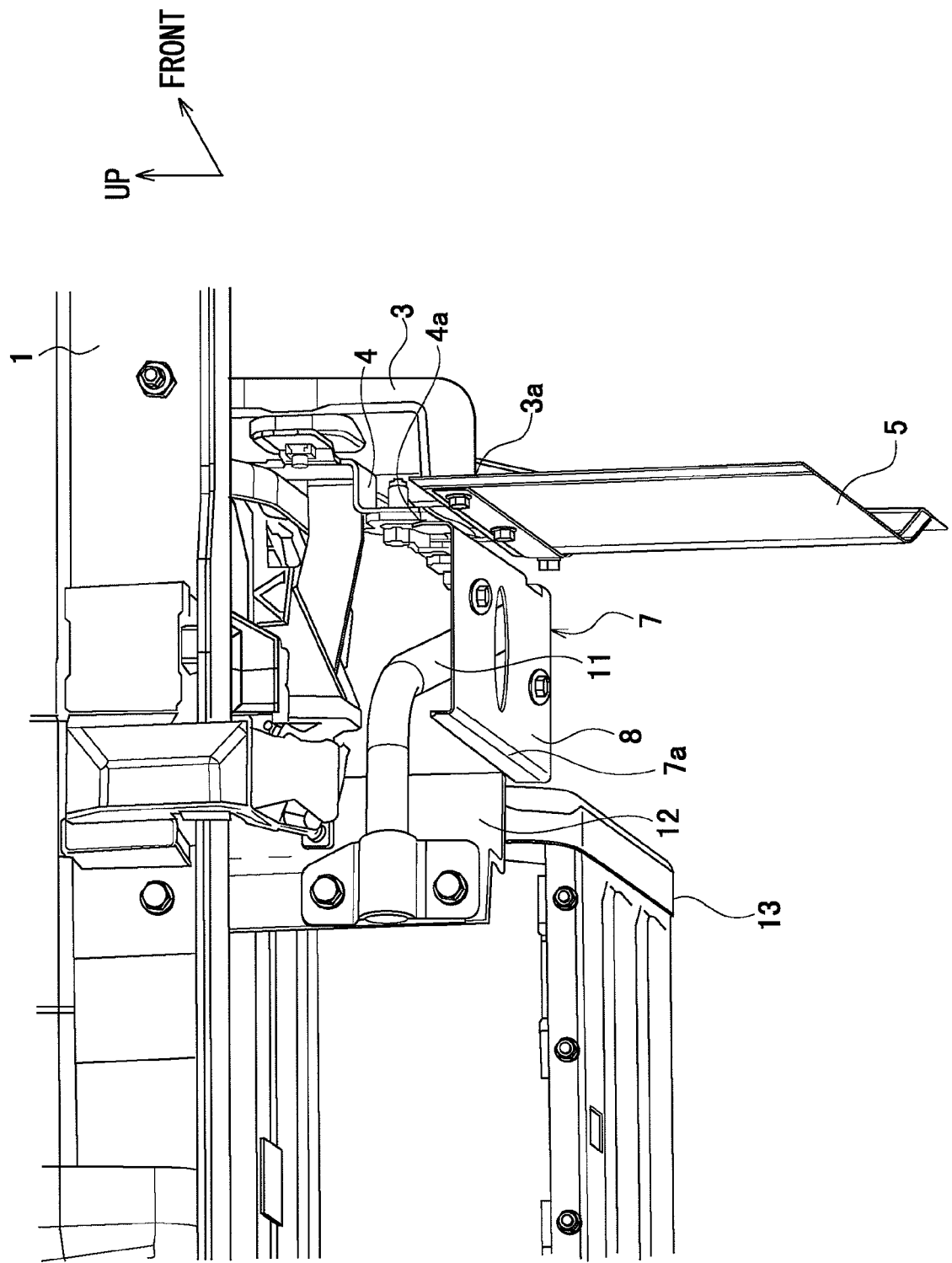
FIG. 4 is an outline perspective view of the relay box protective structure according to the second embodiment.

As shown in FIGS. 3 and 4, the relay box cover 7 is arranged behind the fender 3 and higher than the lower end 3a, and fixed to the lower end 4a of the bracket 4. The relay box cover 7 has an approximate plate shape, and includes a horizontal bottom 8 covering the lower surface 6b of the relay box 6.

An approximately tubular-shaped movement restricting component 11 is arranged behind the back end 7a of the relay box cover 7. The movement restricting component 11 has one end fixed to a battery carrier bracket 12, which is fixed to the frame 1, and the other end joined to an upper surface of the bottom 8 of the relay box cover 7.

A battery carrier 13 is arranged behind the back end 7a of the relay box cover 7 and fixed to the battery carrier bracket 12 of the frame 1.

In this manner, according to the second embodiment, the battery carrier 13 is fixed to the frame 1 behind the back end 7a of the relay box cover 7. Accordingly, the tread surface stripped off when the tire 2 bursts will beat on the battery carrier 13 even if it extends behind the back end 7a of the relay box cover 7. Namely, the battery carrier 13 substantially protects the back surface 6c of the relay box 6. Moreover, since the bottom 8 of the relay box cover 7 is fixed to the frame 1 via the movement restricting component 11 so as to restrict movement towards the vehicle front, even when a strong tensile force towards the vehicle front is applied to the relay box cover 7 from the tread surface, protection of the relay box 6 by the relay box cover 7 may be secured.

Third Embodiment

Figure 5:
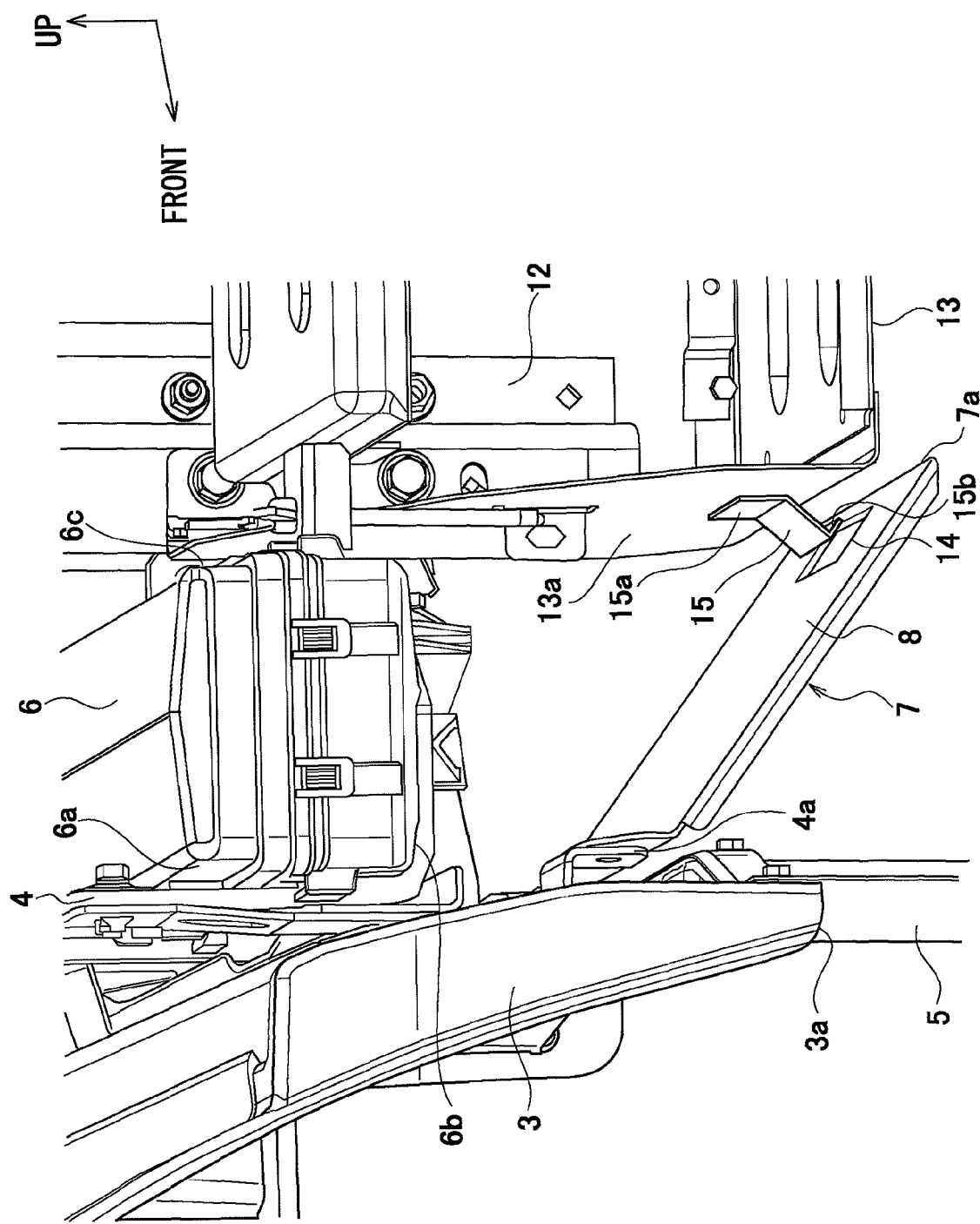
FIG. 5 is an outline perspective view of a relay box protective structure according to a third embodiment.
Figure 6:
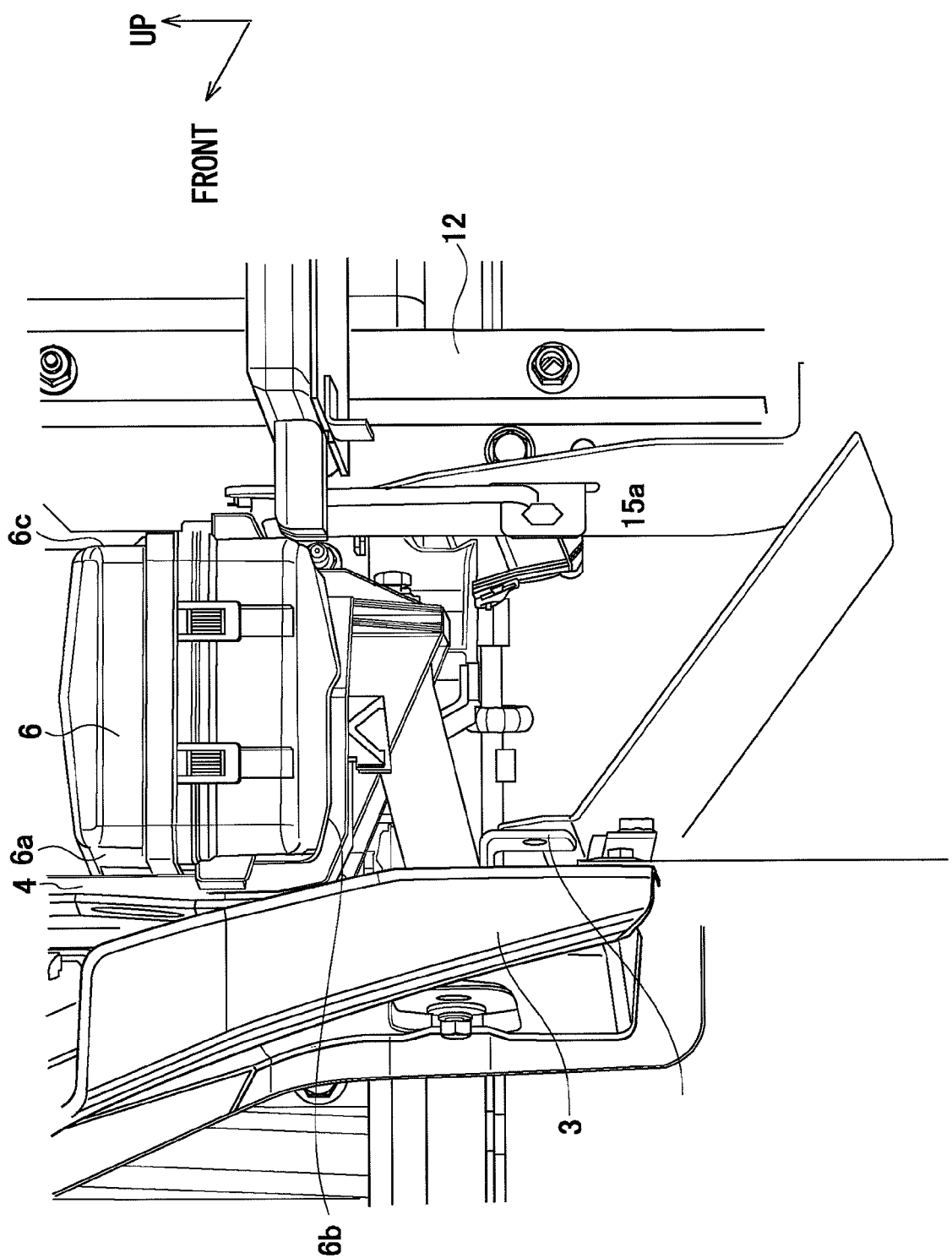
FIG. 6 is an outline perspective view of the relay box protective structure according to the third embodiment.

Next, a third embodiment according to the present invention is described with reference to drawings. FIG. 5 is an outline perspective view of a relay box protective structure according to the third embodiment, and FIG. 6 is an outline perspective view of the relay box protective structure according to the third embodiment. Note that detailed description of a shared structure with the second embodiment is omitted.

As shown in FIGS. 5 and 6, the relay box cover 7 is arranged behind the fender 3 and higher than the lower end 3a, and fixed to the lower end 4a of the bracket 4. The relay box cover 7 has an approximate plate shape, and includes the bottom 8 covering the lower surface 6b of the relay box 6. A hook hole 14 is formed in the bottom 8.

A battery carrier 13 is arranged behind the back end 7a of the relay box cover 7 and fixed to the battery carrier bracket 12, which is fixed to the frame 1.

A movement restricting component 15 having an approximate plate shape is arranged between the front end 13a of the battery carrier 13 and the hook hole 14. The movement restricting component 15 includes a joint 15a joined to the front end 13a of the battery carrier 13 and an engagement part 15b engageable to the hook hole 14.

With this structure, when the tire 2 bursts, the tread surface is stripped off, and the relay box cover 7 is beaten, the relay box cover 7 touches the battery carrier 13 and then is moved towards the vehicle front by the tread surface. At this time, the engagement part 15b of the movement restricting component 15 engages with the hook hole 14 of the relay box cover 7.

In this manner, according to the third embodiment, the battery carrier 13 is fixed to the frame 1 behind the back end 7a of the relay box cover 7. Accordingly, the tread surface stripped off when the tire 2 bursts will beat on the battery carrier 13 even if it extends behind the back end 7a of the relay box cover 7. Namely, the battery carrier 13 substantially protects the back surface 6c of the relay box 6. Moreover, movement of the relay box cover 7 towards the vehicle front is restricted while the hook hole 14 is formed in the relay box cover 7 and the engagement part 15b of the movement restricting component 15 engaged with the battery carrier 13 is joined to the hook hole 14. As a result, even when a strong tensile force towards the vehicle front is applied to the relay box cover 7 from the tread surface, protection of the relay box 6 by the relay box cover 7 may be secured.

Figure 7:
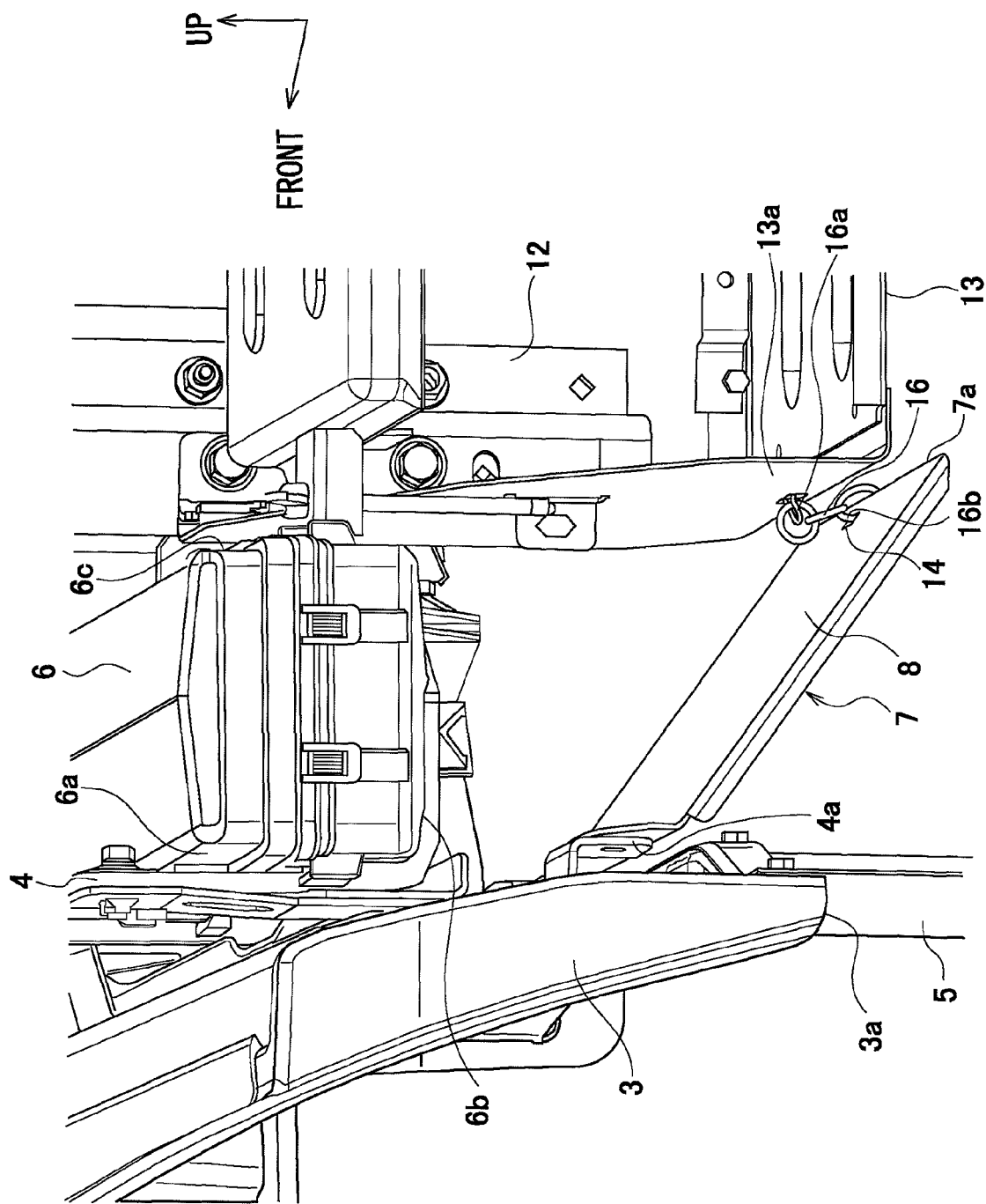
FIG. 7 is an outline perspective view of an exemplary movement restricting component of the relay box protective structure according to the third embodiment.

Next, an exemplary movement restricting component is described based on FIG. 7. FIG. 7 is an outline perspective view of another exemplary movement restricting component of the relay box protective structure according to the third embodiment.

As shown in FIG. 7, a movement restricting component 16 has an approximate chain-shape and includes a holding part 16a fixed to the front end 13a of the battery carrier 13 and an engagement part 16b engageable to the hook hole 14.

With this structure, when the tire 2 bursts, the tread surface is stripped off, and the relay box cover 7 is beaten, the relay box cover 7 touches the battery carrier 13 and is then moved towards the vehicle front by the tread surface. At this time, the engagement part 16b of the movement restricting component 16 engages with the hook hole 14 of the relay box cover 7, restricting movement of the relay box cover 7 towards the vehicle front.

While the embodiment according to the invention devised by the inventor(s) has been described thus far, the present invention is not limited to the descriptions and drawings of this embodiment constituting a part of the disclosure of the present invention. Namely, it should be added that other embodiments, working examples, and operational technologies devised by person(s) skilled in the art according to this embodiment are all naturally included within the scope of this invention.

INDUSTRIAL APPLICABILITY

The present invention is applicable to vehicles including a relay box.

The invention claimed is:

1. A relay box protective structure, comprising:
a fender fixed to a frame of a vehicle body;
a relay box arranged higher than and behind a lower end of the fender, and fixed to the vehicle body;
a relay box cover, which is arranged higher than and behind the lower end of the fender, includes a bottom covering at least a lower surface of the relay box, and is fixed to the vehicle body; and
a movement restricting component fixed to the frame behind a back end of the relay box cover, restricting movement of the relay box cover towards the vehicle front.

2. The relay box protective structure of claim 1, wherein the relay box cover comprises a backside covering a back surface of the relay box, and
the backside is fixed to the frame via the movement restricting component.

3. The relay box protective structure of claim 1, further comprising:
a battery carrier fixed to the frame behind the back end of the relay box cover, wherein
the bottom is fixed to the frame via the movement restricting component.

4. The relay box protective structure of claim 1, wherein the bottom includes a hook hole;
said relay box protective structure further comprises a battery carrier fixed to the frame behind the back end of the relay box cover;
the movement restricting component is arranged between the battery carrier and the hook hole, and comprises one end connected to the battery carrier and other end engageable with the hook hole; and
the other end engages with the hook hole, restricting movement of the relay box cover.

5. The relay box protective structure of claim 1, wherein:
the bottom of the relay box cover comprises a horizontal plate, which has a continuous surface extending substantially horizontally with respect to a horizontal plane to cover the lower surface of the relay box; and
the relay box cover further comprises a vertical backside member, which has a continuous surface extending substantially vertically with respect to the horizontal plane to cover a back surface of the relay box.

6. The relay box protective structure of claim 5, wherein:
the vertical backside member comprises a side end disposed at a side portion of the vertical backside member, and
the movement restricting component is fixed to the side end of the vertical backside member.

* * * * *